United States Patent
Lapicki et al.

(10) Patent No.: US 9,922,670 B1
(45) Date of Patent: Mar. 20, 2018

(54) METHOD OF MANUFACTURING A RECESSED DATA READER PINNING STRUCTURE WITH VERTICAL SIDEWALL

(71) Applicant: Seagate Technology LLC, Cupertino, CA (US)

(72) Inventors: Adam A. Lapicki, Derry (GB); Marcus W. Ormston, Derry (GB); Mark T. Kief, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/078,723

(22) Filed: Mar. 23, 2016

Related U.S. Application Data

(60) Provisional application No. 62/155,297, filed on Apr. 30, 2015.

(51) Int. Cl.
*G11B 5/127* (2006.01)
*H04R 31/00* (2006.01)
*G11B 5/39* (2006.01)

(52) U.S. Cl.
CPC .......... *G11B 5/1272* (2013.01); *G11B 5/3912* (2013.01)

(58) Field of Classification Search
CPC ..... G11B 5/1272; G11B 5/1278; G11B 5/187; G11B 5/2651; G11B 5/295; G11B 5/3116; G11B 5/3163; G11B 5/3929; G11B 5/3945; G11B 5/3967; B82Y 10/00; B82Y 25/00; G01R 7/30; G01R 33/02; G01R 33/09; G01R 33/093; G01R 33/098
See application file for complete search history.

(56) References Cited

U.S. PATENT DOCUMENTS

| | | | |
|---|---|---|---|
| 6,636,395 B1 * | 10/2003 | Terunuma | B82Y 10/00 360/324.11 |
| 7,952,839 B2 | 5/2011 | Yamazaki et al. | |
| 8,507,113 B2 * | 8/2013 | Abarra | B82Y 10/00 360/324.11 |
| 8,675,318 B1 | 3/2014 | Ho et al. | |
| 8,810,974 B2 * | 8/2014 | Noel | G01R 33/098 360/324 |
| 8,896,971 B2 * | 11/2014 | Boonstra | G11B 5/3912 360/319 |
| 8,978,240 B2 * | 3/2015 | Zhang | B82Y 10/00 29/603.11 |
| 9,019,664 B2 | 4/2015 | Song et al. | |
| 9,042,062 B2 | 5/2015 | Hong et al. | |
| 9,099,120 B1 * | 8/2015 | Freitag | G01R 33/098 |
| 9,171,559 B1 | 10/2015 | Nikolaev et al. | |
| 9,286,921 B1 | 3/2016 | Sapozhnikov et al. | |
| 9,368,136 B2 * | 6/2016 | Lu | G11B 5/3912 |
| 2003/0231437 A1 * | 12/2003 | Childress | B82Y 10/00 360/324.12 |
| 2007/0030603 A1 * | 2/2007 | Sato | B82Y 25/00 360/324 |
| 2015/0221328 A1 | 8/2015 | Le et al. | |

\* cited by examiner

*Primary Examiner* — Paul D Kim
(74) *Attorney, Agent, or Firm* — Hall Estill Attorneys at Law

(57) ABSTRACT

A data reader may have a magnetoresistive stack consisting of at least magnetically free and magnetically fixed structures with the magnetically fixed structure set to a first magnetization direction by a pinning structure separated from an air bearing surface by a front shield portion of a magnetic shield. The pinning structure can meet the front shield portion with a planar sidewall angled at 10° or less with respect to the ABS.

19 Claims, 3 Drawing Sheets

US 9,922,670 B1

METHOD OF MANUFACTURING A RECESSED DATA READER PINNING STRUCTURE WITH VERTICAL SIDEWALL

RELATED APPLICATION

The present application makes a claim of domestic priority under 35 U.S.C. § 119(e) to U.S. Provisional Application No. 62/155,297 filed Apr. 30, 2015, the contents of which are incorporated by reference.

SUMMARY

A data reader, in accordance with some embodiments, has a magnetoresistive stack consisting of at least magnetically free and magnetically fixed structures with the magnetically fixed structure set to a first magnetization direction by a pinning structure separated from an air bearing surface by a front shield portion of a magnetic shield. The pinning structure meets the front shield portion with a planar sidewall angled at 10° or less with respect to the ABS.

DETAILED DESCRIPTION

Data storage devices have strived for larger data storage capacity and faster data access times. As the design of data storage components, like data readers and data writers, reduce in size to provide decreased magnetic footprints, the construction of designed component features can be difficult to provide accurately and efficiently. For example, decreasing the size of a data reader to nanometer scale dimensions can cause minor deviations in deposited materials to greatly vary the operating performance of the data reader. Hence, it is a continued industry and consumer goal to increase manufacturing accuracy of data storage components with decreased physical size.

Accordingly, a data reader can have, in various embodiments, a magnetoresistive stack consisting of at least magnetically free and magnetically fixed structures with the magnetically fixed structure set to a first magnetization direction by a pinning structure separated from an air bearing surface by a front shield portion of a magnetic shield where the pinning structure meets the front shield portion with a planar sidewall angled at 10° or less with respect to the ABS. The substantially vertical orientation of the interface between the pinning structure and front shield portion can optimize the recessed position of the pinning structure from the ABS as well as the performance of the magnetoresistive stack deposited thereon. The tuned utilization of material deposition and removal steps in accordance with assorted embodiments, can construct the planar sidewall with the 10° or less orientation with respect to the ABS.

Figure 1:
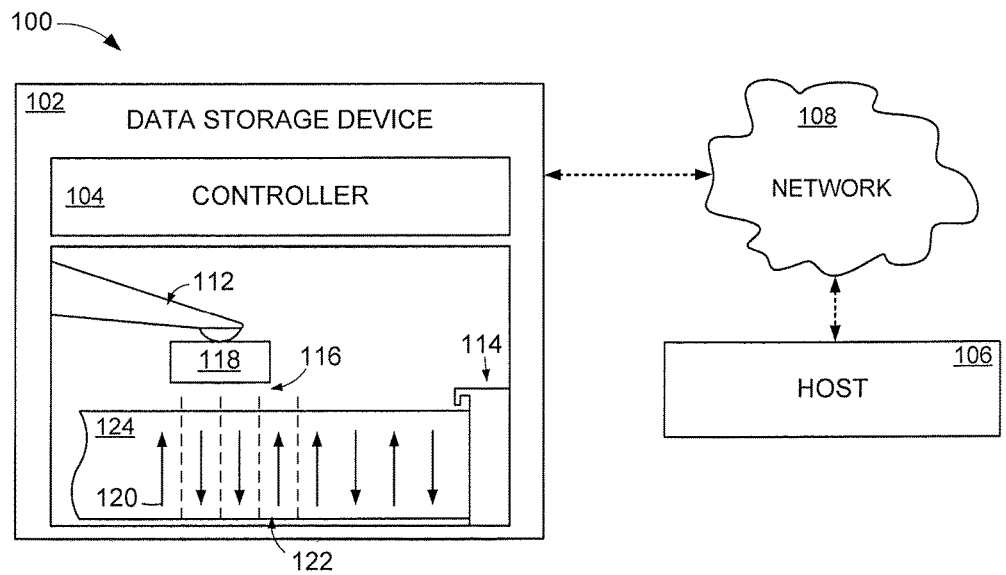
FIG. 1 is a line representation of an example data storage system configured and operated in accordance with some embodiments.

Although not required or limiting, FIG. 1 is a block representation of an example data storage system 100 that can employ a data reader in accordance with assorted embodiments. The data storage system 100 can have any number of data storage devices 102, such as a hard disk drive and hybrid data storage device, that each have at least one local controller 104. The local controller 104 can communicate with one or more remote hosts 106, such as a server and/or node, via a wired or wireless network 108 to direct data access operations to and from the local data storage device 102.

Regardless of the complexity of data access control, data access operations can be carried out by a transducing assembly 110 that has an actuator assembly 112 and spindle 114 that operate to create an air bearing 116 on which a transducing head 118 flies to access selected data bits 120 and data track 122 portions of the data storage medium 124. In an effort to increase data capacity of the data storage device 102, the data bits 120 and data tracks 122 can have reduced size and increased density so that less non-magnetic material separates the data bits 120. Such increased data density corresponds with more precise magnetic resolution needed for data accessing components to access individual data bits.

Figure 2:
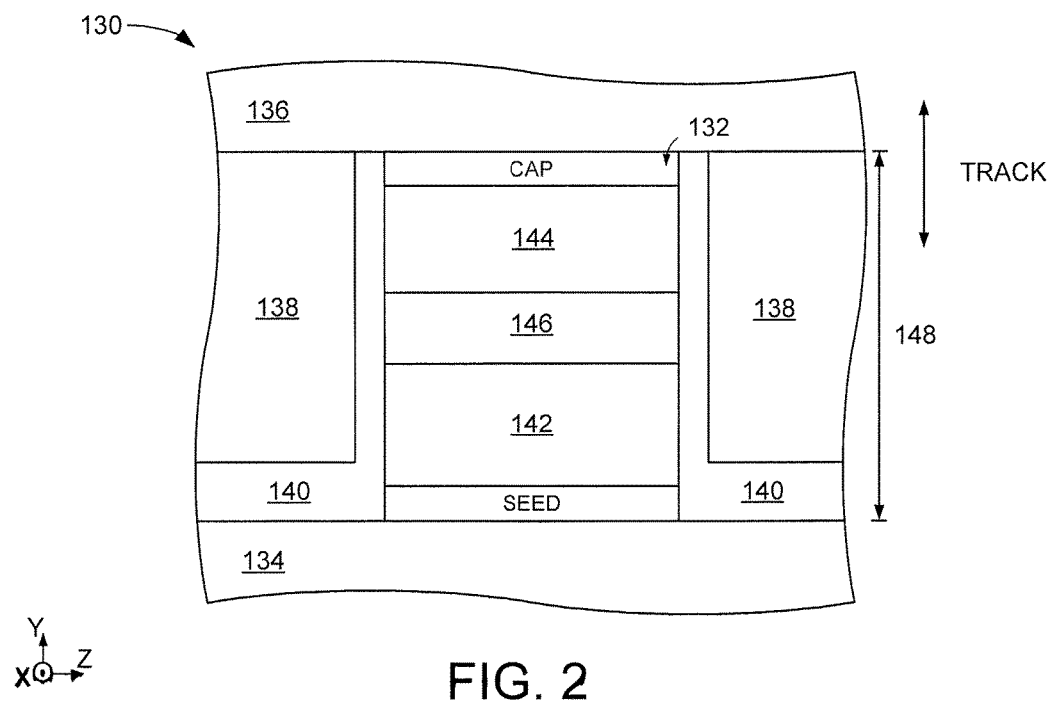
FIG. 2 displays a line representation of a portion of an example data reader capable of being used with the data storage system of FIG. 1.

FIG. 2 displays an air bearing surface (ABS) view line representation of a portion of an example data reader 130 that may be employed in the data storage system 100 of FIG. 1 in accordance with some embodiments. As shown, the data reader 130 has a magnetoresistive stack 132 disposed between bottom 134 and top 136 shields as well as between side shields 138. It is noted that the terms "bottom" and "top" are not limiting and are meant to denote relative position either down-track or up-track relative to a data track and the motion of the data reader 130.

The magnetoresistive stack 132 can be separated from the side shields 138 by lateral nonmagnetic layers 140 and separated from the bottom 134 and top 136 shields by conductive cap and seed electrode layers, respectively. The magnetoresistive stack 132 may be configured in a variety of different manners to sense data from an adjacent data storage medium. For example, the magnetoresistive stack 132 may be a spin valve, trilayer lamination without a fixed magnetization, or a lateral spin valve with a fixed magnetization structure 142 separated from a magnetically free structure 144 by a spacer structure 146.

Decreasing the shield-to-shield spacing (SSS) 148 of the data reader 130 can increase data bit linear resolution, but can correspond with increased magnetic and thermal volatility that results in degraded performance. In other words, a small SSS 148 can decrease the physical size of the various layers of the magnetoresistive stack 132, but can also increase the risk of inadvertent magnetic behavior that can jeopardize the accuracy of data bit sensing.

Figure 3A:
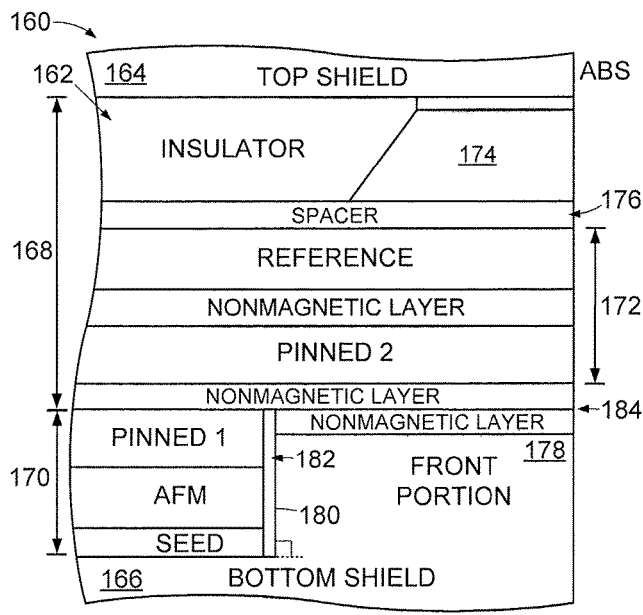
FIGS. 3A and 3B respectively show cross-sectional line representations of portions of an example data reader configured in accordance with some embodiments.
Figure 3B:
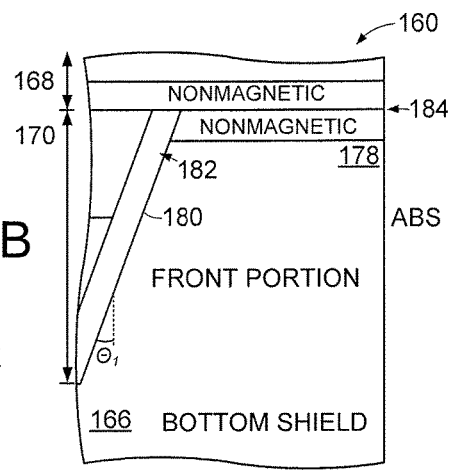

FIGS. 3A and 3B respectively show a cross-section view line representations of portions of an example data reader 160 arranged in accordance with assorted embodiments to increase magnetic performance despite a reduced SSS. The data reader 160 is shown with a magnetoresistive (MR) stack 162 disposed between top 164 and bottom 166 shields that define the SSS 168. By recessing a fixed magnetization reference pinning structure 170 away from the ABS, the reference structure 172 of the MR stack 162 can be set to a predetermined magnetization orientation without adding to the SSS 168.

It is noted that the MR stack 162 is configured as a spin valve in FIG. 3A with a magnetically free layer 174 separated from the fixed magnetization reference structure 172 by a non-magnetic spacer layer 176, but such configuration is not required or limiting as lateral spin valve and abutted junction configurations may be utilized. The reference structure 172 may be configured as a single layer or as a lamination of magnetic and non-magnetic layers. Removal of the fixed magnetization reference pinning structure 170 from the ABS reduces the SSS, but leaves the front portion 178 of the bottom shield 166 vulnerable to unpredictable magnetic volatility.

The lateral alignment of the fixed magnetization reference pinning structure 170 and the front portion 178 along the X axis can restrict the physical connection of the front portion 178 with the bottom shield 166, which can result in coupling that is inadequate to control magnetization, such as with the formation of magnetic domain walls. It is contemplated that the configuration of the interface 180 between the pinning structure 170 and the front portion 178 can tune and optimize the magnetic performance of the front portion 178 and bottom shield 166.

FIG. 3B illustrates how a non-magnetic buffer layer 182 can be positioned between the pinning structure 170 and the front portion 178 to define an interface sidewall 180. The vertical orientation of the interface sidewall 180, as defined by being parallel to the ABS, may be present despite the absence of the buffer layer 182. That is, the interface sidewall 180 can be present regardless of the presence of the buffer layer 182 material. The interface sidewall 180 may, in some embodiments, be angled towards the ABS, as shown by $\Theta_1$, which can be tuned to be 10° or less with respect to the ABS and the Y axis. The ability to tune the interface sidewall 180 to a near vertical orientation allows for increased front portion uniformity and increased planarity at the stack interface 184.

Figure 4:
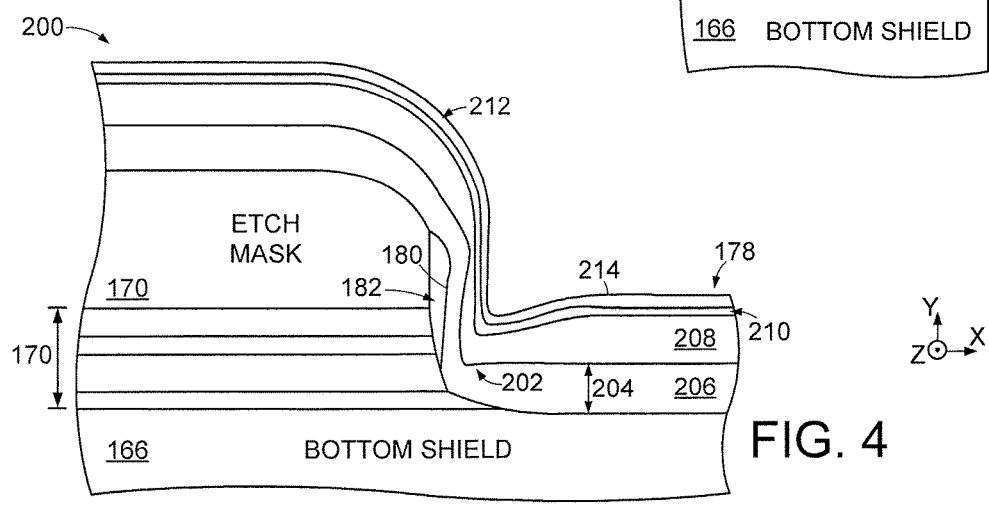
FIG. 4 illustrates a cross-section line representation of a portion of an example data reader arranged in accordance with various embodiments.

While a vertical or near vertical pinning structure interface sidewall 180 can conceptually provide increased data reader 160 performance, fabrication of a planar sidewall with a vertical or near vertical orientation can pose challenges. FIG. 4 displays a line representation of a portion of an example data reader 200 that has been constructed with various lithographic techniques. The formation of the pinning structure 170 on the lower portion of the bottom shield 166 creates a feature that produces a shadow effect during the deposition of subsequent thin films, such as magnetic materials that constitute the front portion of the bottom shield. The depression 202 proximal the pinning structure interface sidewall 180 is evidence that collimated ion-beam sputtering deposition has experienced unwanted shadow effects that create variable film thickness 204.

The depression of a first layer 206 of the front portion 178 of the bottom shield 166 gets exaggerated with the subsequent deposition of second 208, third 210, and fourth 212 shield layers. As a result of the exaggeration of the non-uniform shield layer thickness 204, the stack interface 214 has a non-planar configuration, which can degrade the structure and operation of a magnetoresistive stack deposited thereon. Hence, the mitigation of the depression 202 leads to increased shield layer thickness uniformity and a more planar stack interface 214.

Figure 5A:
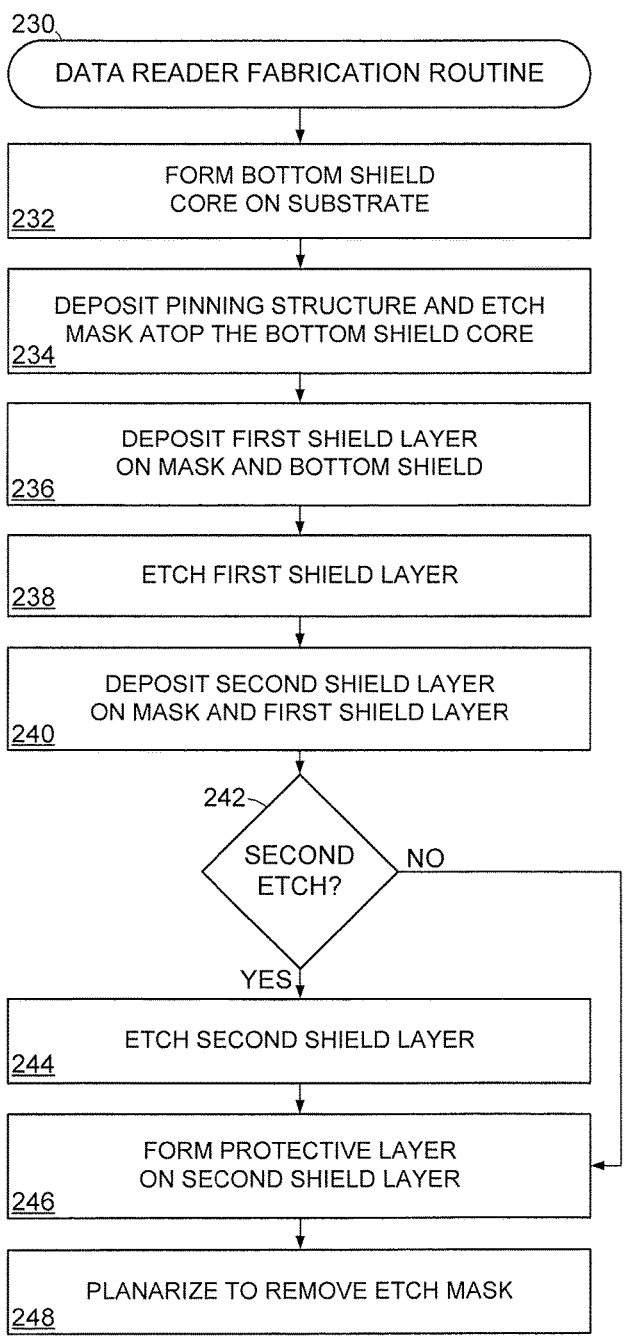
FIGS. 5A and 5B respectively depict a flowchart and example structures associated with a data reader fabrication routine carried out in accordance with some embodiments.
Figure 5B:
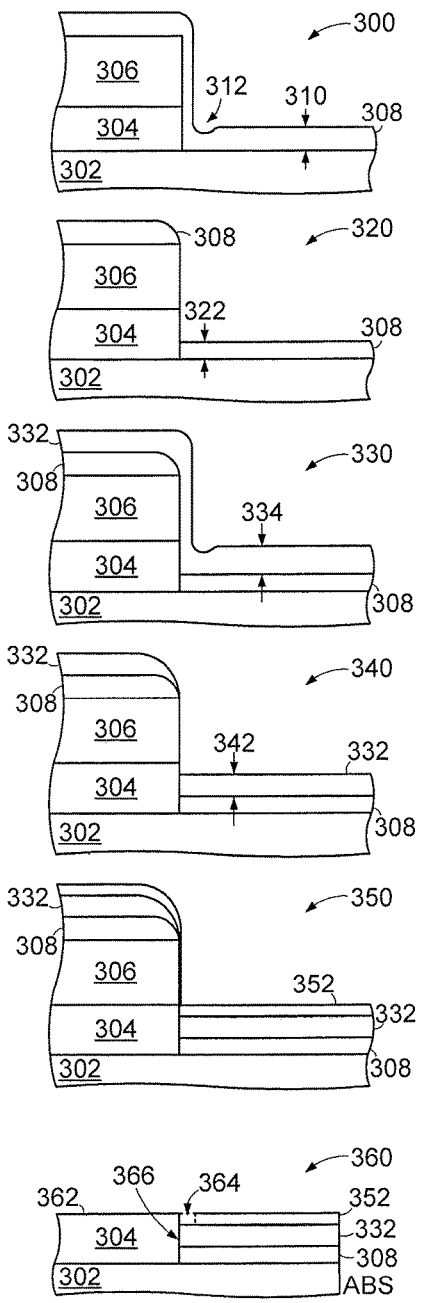

Accordingly, various embodiments conduct etching operations to define a vertical or near vertical pinning structure interface 180 that corresponds with the mitigation of the depression 202. FIGS. 5A and 5B respectively illustrate an example recessed pinning structure fabrication routine 230 along with structural examples that correspond with the assorted steps and decisions. The routine 230 begins by forming a bottom shield 302 in step 232 that can be one or more magnetic and/or non-magnetic layers, as shown in reader 300. A pinning structure 304 and etch mask 306 are subsequently deposited atop the bottom shield 302 in step 234. It is noted that the pinning structure 304 may consist of any number of magnetic and/or non-magnetic layers, but is configured in some embodiments, with an antiferromagnetic layer contacting a pinning layer, as shown in FIG. 3B.

Data reader 300 displays how the pinning structure 304 is disposed between the etch mask 306 and the bottom portion of the bottom shield 302. Step 236 of routine 230 proceeds to deposit a first front shield layer 308 on the bottom shield 302, pinning structure 304, and etch mask 306. The first front shield layer 308 can be magnetic or non-magnetic and may be deposited with highly collimated ion-beam sputtering to have a high thickness 310, as measured parallel to an ABS, and a lower thickness depression 312 proximal the mask 306 that caused a shadowing effect during sputtering deposition of the first mask layer 308.

Next, step 238 etches the first shield layer 308, as illustrated in reader 320. In some embodiments, but in no way limiting, step 238 is carried out with a 10° or less dry-etch process with respect to the surface of the first shield layer 308, which is perpendicular to the ABS. The etching conducted in step 238 provides a uniform lower first shield layer thickness 322 that continuously extends from the pinning structure 304 toward the ABS. The uniform layer thickness 322 eliminates the depression 312 and provides an optimized substrate for step 240 to deposit a second shield layer 332 on top.

Reader 330 displays how despite the uniform first shield layer thickness 322, the second shield layer 332 can experience varying thickness 334 due to shadowing effects from the etch mask 306. It is contemplated that the thickness 322 of the first shield layer can be tuned to reduce or eliminate the varying second shield layer thickness 334 by decreasing the height gradient between the mask 306 and the first shield layer 308. With the second shield layer 332 having a varying thickness 334, decision 242 determines if a second etching process is to be conducted in step 244 to provide a uniform second shield layer thickness 342, as shown in reader 340.

In the event decision 242 does not conduct a second etching, or at the conclusion of the second etching in step 244, step 246 proceeds to form a protective layer 352 atop the second shield layer 332. The protective layer 352 may be any number of materials, such as Pt, Pd, Rh, Ir, and alloys involving significant fractions of those elements. It is contemplated that the protective layer 352 can comprise multiple layers of dissimilar material. Configuring the protective layer 352 of a material with good chemical mechanical polish stop performance and chemical inertness allows step 248 to planarize a reader 360 and form a magnetic stack interface surface 362. Such planarization can be executed with any type of polishing or etching, without limitation.

Reader 360 shows how the etch mask 306, and layers positioned thereon, are removed during planarization in step 248. It is noted that the configuration of the protective layer 352 can be different depending on whether step 244 is performed. That is, if decision 242 skips a second etching of a reader, the protective layer 352 will not extend up to the mask 306 and an open portion 364 will be present where the second shield layer 332 extends to the stack interface surface 362. If step 244 is conducted, the protective layer 352 will continuously extend to the pinning structure 304.

It is noted that the various aspects of routine 230 are not required or limiting. As such, any step or decision can be inserted, removed, or modified from that shown in FIGS. 5A and 5B. For example, additional steps can form a magnetoresistive stack on the stack interface 362. As another non-limiting example, additional steps can tune the angle of the pinning structure interface 366 with respect to the ABS, such as tilted 10° towards the ABS.

With the ability to tune the sidewall interface of the pinning structure to be parallel or within 10° of the ABS, the pinning structure can be recessed from the ABS by the front portion of the bottom shield without inhibiting the magnetic performance of the front portion. The tuned configuration of the pinning structure can also provide an increasingly uniform stack interface that allows a magnetoresistive stack to be subsequently deposited with optimized performance. It can be appreciated that through the tuned front portion shield layer thicknesses and etching process(es) the pinning structure can be configured with the vertical sidewall interface that would not be possible with successive lithography deposition of the front portion shield layers.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
    forming a pinning structure atop a bottom magnetic shield, the pinning structure separated from an air bearing surface (ABS);
    depositing a first shield layer on the pinning structure and bottom magnetic shield, the first shield layer continuously extending to the pinning structure from the ABS, the first shield layer having a varying thickness proximal an interface surface of the pinning structure;
    planarizing the first shield layer to provide a uniform first shield layer thickness from the interface surface to the ABS; and
    creating a second shield layer atop the first shield layer, the second shield layer continuously extending from the ABS to the interface surface, the interface surface oriented towards the ABS at 10° or less.

2. The method of claim 1, wherein the interface surface is parallel to the ABS.

3. The method of claim 1, wherein the interface surface contacts a non-magnetic buffer layer disposed between the pinning structure and the first shield layer.

4. The method of claim 1, wherein the first shield layer is separated from a magnetoresistive stack by at least one non-magnetic layer.

5. The method of claim 1, wherein the interface surface is continuously linear.

6. The method of claim 1, wherein the interface surface extends from a seed layer of the pinning structure to a pinned layer of the pinning structure.

7. The method of claim 1, wherein the pinning structure sets a fixed magnetization in a reference portion of a magnetoresistive stack.

8. The method of claim 1, wherein the first shield layer continuously extends to the bottom magnetic shield.

9. The method of claim 1, wherein the planarization is produced with dry-etching oriented perpendicular to the ABS.

10. The method of claim 1, wherein the second shield layer has a varying thickness proximal the interface surface, the thicknesses of the respective first and second shield layers each measured parallel to the ABS.

11. The method of claim 1, wherein the first and second shield layers are each present atop the pinning structure until a top surface of the pinning structure is exposed and a magnetoresistive stack is subsequently deposited to contact the pinning structure.

12. The method of claim 1, further comprising depositing a protective layer on the second shield layer and continuously extends from the ABS to a plane that is separated from the interface surface.

13. A method comprising:
    forming a pinning structure atop a bottom magnetic shield, the pinning structure separated from an air bearing surface (ABS);
    depositing a first shield layer on the pinning structure and bottom magnetic shield, the first shield layer continuously extending to the pinning structure from the ABS, the first shield layer having a varying thickness proximal an interface surface of the pinning structure;
    planarizing the first shield layer to provide a uniform first shield layer thickness from the interface surface to the ABS;
    creating a second shield layer atop the first shield layer, the second shield layer continuously extending from the ABS to the interface surface with a varying thickness proximal the interface surface; and
    etching the second shield layer to provide a uniform second shield layer thickness, the interface surface oriented towards the ABS at 10° or less.

14. The method of claim 13, wherein the planarizing and etching steps are localized to between the interface surface and the ABS.

15. The method of claim 13, wherein a non-magnetic layer continuously extends from the ABS to separate the second shield layer and pinning structure from a magnetoresistive stack.

16. The method of claim 13, wherein the bottom portion of the magnetic shield continuously extends from the ABS a longer distance than the first or second shield layers.

17. The method of claim 13, wherein the first and second shield layers are separated from the pinning structure by a non-magnetic buffer layer that contacts the interface surface.

18. The method of claim 13, wherein the varying thicknesses of the respective first and second shield layers are formed due to shadowing effects during deposition.

19. A method comprising:
    depositing a bottom magnetic shield on a substrate;
    forming a pinning structure in contact with a bottom magnetic shield, the pinning structure separated from an air bearing surface (ABS);
    depositing a first shield layer on the pinning structure and bottom magnetic shield, the first shield layer continuously extending to the pinning structure from the ABS, the first shield layer having a varying thickness proximal an interface surface of the pinning structure;
    planarizing the first shield layer to provide a uniform first shield layer thickness from the interface surface to the ABS; and
    creating a second shield layer atop the first shield layer, the second shield layer continuously extending from the ABS to the interface surface, the interface surface oriented towards the ABS at 10° or less.

* * * * *